US012772118B2

(12) United States Patent
Sun et al.

(10) Patent No.: US 12,772,118 B2
(45) Date of Patent: Oct. 20, 2026

(54) METHODS AND APPARATUSES FOR A PRE-EMPTION CHECK PROCEDURE FOR A SIDELINK TRANSMISSION

(71) Applicant: Lenovo (Beijing) Limited, Beijing (CN)

(72) Inventors: Zhennian Sun, Beijing (CN); Xiaodong Yu, Beijing (CN); Haipeng Lei, Beijing (CN); Xin Guo, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 436 days.

(21) Appl. No.: 18/273,615

(22) PCT Filed: Feb. 5, 2021

(86) PCT No.: PCT/CN2021/075411

§ 371 (c)(1),
(2) Date: Jul. 21, 2023

(87) PCT Pub. No.: WO2022/165734

PCT Pub. Date: Aug. 11, 2022

(65) Prior Publication Data

US 2024/0089803 A1 Mar. 14, 2024

(51) Int. Cl.
*H04W 28/26* (2009.01)
*H04W 72/02* (2009.01)
(Continued)

(52) U.S. Cl.
CPC ........... *H04W 28/26* (2013.01); *H04W 72/02* (2013.01); *H04W 72/25* (2023.01); *H04W 72/40* (2023.01)

(58) Field of Classification Search
CPC ..... H04W 28/26; H04W 72/25; H04W 72/40; H04W 72/02
See application file for complete search history.

(56) References Cited

U.S. PATENT DOCUMENTS

| | | | |
|---|---|---|---|
| 2020/0029340 | A1 | 1/2020 | He et al. |
| 2020/0359389 | A1 | 11/2020 | Bharadwaj et al. |

(Continued)

FOREIGN PATENT DOCUMENTS

| | | |
|---|---|---|
| CN | 110248412 | 9/2019 |
| CN | 111492708 A | 8/2020 |

(Continued)

OTHER PUBLICATIONS

PCT/CN2021/075411 , "International Preliminary Report on Patentability", PCT Application No. PCT/CN2021/075411, Aug. 17, 2023, 5 pages.

(Continued)

*Primary Examiner* — Won Tae C Kim
(74) *Attorney, Agent, or Firm* — FIG. 1 Patents

(57) ABSTRACT

Embodiments of the present disclosure relate to methods and apparatuses for a pre-emption check procedure for a sidelink transmission in 3 GPP (3rd Generation Partnership Project) 5G networks. According to an embodiment of the present disclosure, a method performed by a user equipment (UE) includes: receiving, from another UE, information associated with a pre-emption check procedure on another reserved resource of the abovementioned UE; and making an adjustment relating to a transmission on a reserved resource of the UE according to the information.

20 Claims, 2 Drawing Sheets

(51) Int. Cl.
*H04W 72/25* (2023.01)
*H04W 72/40* (2023.01)

(56) References Cited

U.S. PATENT DOCUMENTS

| | | | | |
|---|---|---|---|---|
| 2021/0105066 | A1* | 4/2021 | Uchiyama | H04W 88/04 |
| 2022/0201528 | A1 | 6/2022 | Shin et al. | |
| 2022/0322360 | A1* | 10/2022 | Ye | H04W 72/563 |
| 2023/0254817 | A1* | 8/2023 | Zhao | H04B 17/328 370/329 |
| 2023/0300713 | A1* | 9/2023 | Hoang | H04L 67/51 370/254 |
| 2023/0309119 | A1* | 9/2023 | Mohammad Soleymani | H04W 72/25 |
| 2023/0309125 | A1* | 9/2023 | Li | H04W 72/1263 |

FOREIGN PATENT DOCUMENTS

| | | | |
|---|---|---|---|
| CN | 111586722 | A | 8/2020 |
| WO | 2019157739 | A1 | 8/2019 |
| WO | 2020017012 | A1 | 1/2020 |
| WO | 2020064325 | A1 | 4/2020 |
| WO | 2020222532 | A1 | 11/2020 |

OTHER PUBLICATIONS

PCT/CN2021/075411 , “International Search Report and Written Opinion”, PCT Application No. PCT/CN2021/075411, Nov. 11, 2021, 6 pages.

21923754.2 , “Extended European Search Report”, EP Application No. 21923754.2, Sep. 24, 2024, 12 pages.

ETRI , “Discussion on resource allocation for power saving”, 3GPP TSG RAN WG1 Meeting #104-e, R1- 2101086, e-Meeting, Jan. 2021, 4 pages.

LG Electronics , “Discussion on resource allocation for power saving”, 3GPP TSG RAN WG1 Meeting #104-e, R1-2100517, e-Meeting, Jan. 2021, 20 pages.

Foreign Office Action issued in CN 202180092299.6, mailed Jul. 31, 2026, 16 pages.

Huawei et al., “Sidelink resource allocation to reduce power consumption,” 3GPP TSG RAN WG1 Meeting #104-e, R1-2100205, Jan. 25, 2021, 13 pages.

* cited by examiner

METHODS AND APPARATUSES FOR A PRE-EMPTION CHECK PROCEDURE FOR A SIDELINK TRANSMISSION

TECHNICAL FIELD

Embodiments of the present application are related to wireless communication technology, and more particularly, related to methods and apparatuses for a pre-emption check procedure for a sidelink transmission in 3GPP (3rd Generation Partnership Project) 5G networks.

BACKGROUND

Vehicle to everything (V2X) has been introduced into 3GPP 5G wireless communication technology. In terms of a channel structure of V2X communication, a direct link between two UEs is called a sidelink. A sidelink is a long-term evolution (LTE) feature introduced in 3GPP Release 12, and enables a direct communication between proximal UEs, and data does not need to go through a base station (BS) or a core network.

3GPP 5G networks are expected to increase network throughput, coverage, and robustness and reduce latency and power consumption. With the development of 3GPP 5G networks, various aspects need to be studied and developed to perfect the 5G technology. Currently, details regarding a pre-emption check procedure for a sidelink transmission have not been discussed in 3GPP 5G technology yet.

SUMMARY

Some embodiments of the present application provide a method, which may be performed by a user equipment (UE). The method includes: receiving, from another UE, information associated with a pre-emption check procedure on another reserved resource of the abovementioned UE; and making an adjustment relating to a transmission on a reserved resource of the UE according to the information.

Some embodiments of the present application provide a further method, which may be performed by a UE. The method includes: transmitting, to another UE, information associated with a pre-emption check procedure on a reserved resource of the UE.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement any of the abovementioned methods performed by a UE.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

In a V2X communication system, a transmission UE may also be named as a transmitting UE, a Tx UE, a sidelink Tx UE, a sidelink transmission UE, or the like. A reception UE may also be named as a receiving UE, a Rx UE, a sidelink Rx UE, a sidelink reception UE, or the like.

Figure 1:
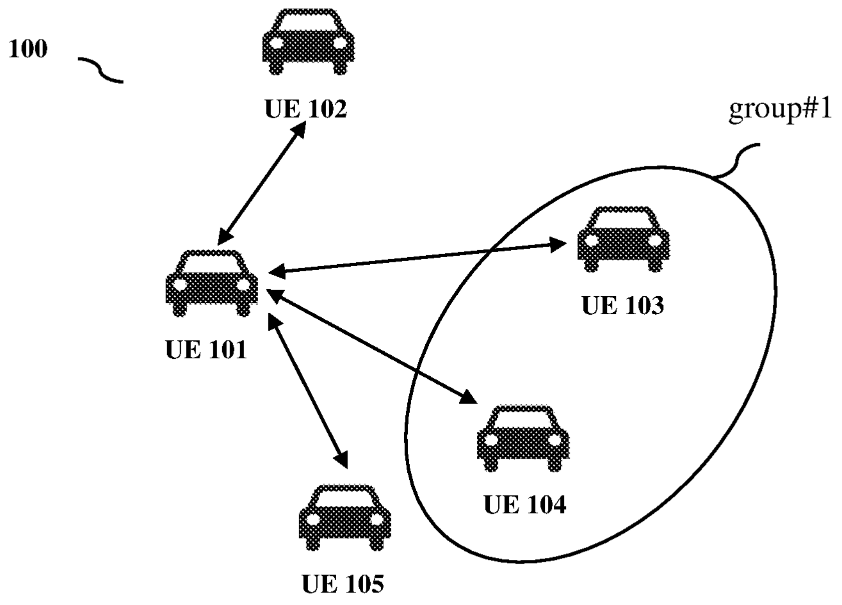
FIG. 1 illustrates an exemplary V2X communication system in accordance with some embodiments of the present application.

FIG. 1 illustrates an exemplary V2X communication system in accordance with some embodiments of the present application.

As shown in FIG. 1, a wireless communication system 100 includes at least five user equipments (UEs), including one Tx UE (i.e., UE 101 as shown in FIG. 1) and four Rx UEs (i.e., UE 102, UE 103, UE 104, and UE 105 as shown in FIG. 1), for illustrative purpose. Although a specific number of UEs are depicted in FIG. 1, it is contemplated that any number of UE(s) (e.g., Tx UE(s) or Rx UE(s)) may be included in the wireless communication system 100.

The V2X transmission implemented in the wireless communication system 100 of the embodiments of FIG. 1 includes unicast transmission, groupcast transmission, and broadcast transmission. For example, UE 102 and UE 105 represent Rx UEs for unicast transmission. UE 103 and UE 104 may form group #1 as shown in FIG. 1. In one example, group #1 may correspond to a sidelink groupcast session for groupcast transmission. UE 101 may transmit data to UE 103 and UE 104 in group #1 through a sidelink groupcast session. In a further example, group #1 may correspond to a sidelink broadcast session for broadcast transmission. UE 101 may transmit data to UE 103 and UE 104 in group #1 through a sidelink broadcast session.

Each UE in FIG. 1 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, a UE in FIG. 1 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, a UE in FIG. 1 is a pedestrian UE (P-UE or PUE) or a cyclist UE. In some embodiments of the present application, a UE in FIG. 1 includes wearable devices, such as smart watches, fitness bands, optical head-mounted displays, or the like. Moreover, a UE in FIG. 1 may be referred to as a subscriber unit, a mobile, a mobile station, a user, a terminal, a mobile terminal, a wireless terminal, a fixed terminal, a subscriber station, a user terminal, or a device, or described using other terminology used in the art. A UE in FIG. 1 may communicate directly with a base station (BS) via LTE or NR Uu interface.

In some embodiments of the present application, each UE in FIG. 1 may be deployed an IoT application, an enhanced mobile broadband (eMBB) application and/or an ultra-reliable and low latency communication (URLLC) application. For instance, UE 101 may implement an IoT application and may be named as an IoT UE, while UE 102 may implement an eMBB application and/or a URLLC application and may be named as an eMBB UE, an URLLC UE, or an eMBB/URLLC UE. It is contemplated that the specific type of application(s) deployed in the UE in FIG. 1 may be varied and not limited.

According to some embodiments of FIG. 1, a UE may exchange V2X messages with another UE(s) through a sidelink, for example, PC5 interface as defined in 3GPP standard document TS23.303. The UE may transmit information or data to another UE(s) within the V2X communication system, through sidelink unicast, sidelink groupcast, or sidelink broadcast.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) (not shown in FIG. 1) transmit data using an OFDM modulation scheme on the downlink (DL) and the UE(s) in FIG. 1 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

Currently, two sidelink resource allocation modes are supported, i.e., Mode 1 and Mode 2. In Mode 1, sidelink resource(s) in time and frequency domains allocation is provided by a network or a BS. In Mode 2, a UE decides sidelink transmission resource(s) in time and frequency domains in a resource pool. According to agreements on a pre-emption check procedure of 3GPP Release 16 V2X, a resource pre-emption check procedure is supported by UE(s) that perform sensing, but not supported by UE(s) that do not perform any sensing (i.e., a physical sidelink control channel (PSCCH) reception); and a resource pre-emption check procedure for Mode 2 is supported. A resource pre-emption check procedure may also be named as a pre-emption check procedure or the like.

In particular, a UE triggers a resource re-selection scheme of already signaled resource(s) as a resource reservation in a case that: (1) the already signaled resource(s) is overlapped with resource(s) of a higher priority reservation from a different UE; and (2) a sidelink reference signal received power (SL-RSRP) measurement associated with the resource(s) reserved by that different UE is higher than an associated SL-RSRP threshold. For a pre-emption check procedure, both full and partial frequency domain overlap in the same slot are considered as the overlapping condition to trigger a resource re-selection scheme, and the whole resource(s) is reselected even if only a partial overlap happens. Once a resource re-selection condition associated with the pre-emption check procedure is met at a UE, a resource re-selection scheme is performed for all resources(s) which satisfy the resource re-selection condition.

According to agreements made in 3GPP RAN1 meeting, in Release 17 sidelink, a resource pool can be configured to enable full sensing only, partial sensing only, random resource selection only, or any of their combination(s). In Release 16 V2X, a UE may perform a pre-emption check procedure before a reserved sidelink transmission occasion happens. During performing a pre-emption check procedure, a UE needs to determine whether following Conditions 1-3 are fulfilled. A resource re-selection scheme will be triggered if all Conditions 1-3 are fulfilled during the pre-emption check procedure.

(1) Condition 1: Full or partial resource(s) overlap happens.

(2) Condition 2: SL-RSRP measurement result(s) associated with a resource reserved by a different UE is higher than an associated SL-RSRP threshold.

(3) Condition 3: A priority of the pre-empting traffic is higher than a threshold and higher than the priority of the pre-empted traffic.

According to agreements in 3GPP RAN1 meeting, following three types of power sensitive UE are defined. A power sensitive UE may also be named as a power saving UE or the like.

1) Type A UE without a sidelink reception capability. Type A UE can only do a random resource selection scheme. According to agreements of 3GPP RAN1-103*e* meeting, Type A UE is not capable of performing a reception of any sidelink signals and channels, a physical sidelink feedback channel (PSFCH) reception is not included for Type A UE, and a sidelink synchronization signal block (S-SSB) reception is not included for Type A UE.

2) Type B UE with only PSFCH and S-SSB reception capability. The same as Type A UE, Type B UE can only do a random resource selection scheme, and Type B UE is with an exception of performing PSFCH and S-SSB reception.

3) Type D UE with a sidelink reception capability. Type D UE can do a resource selection scheme based on partial sensing or do a random resource selection scheme. Type D UE may select a partial sensing scheme or a random resource selection scheme by the Type D UE's implementation. Type D UE is capable of performing a reception of all sidelink signals and channels defined in 3GPP Release 16. Type D UE does not preclude a UE to perform reception of a subset of sidelink signals or channels.

According to agreements of 3GPP Release 17 sidelink, a resource pool can be configured with following different cases:

| | |
|---|---|
| Case 1 | Random resource selection only |
| Case 2 | Partial sensing only |
| Case 3 | Full sensing only |
| Case 4 | Random resource selection + Partial sensing |
| Case 5 | Random resource selection + Full sensing |
| Case 6 | Partial sensing + Full sensing |
| Case 7 | Random resource selection + Partial sensing + Full sensing |

For the abovementioned Case 4, Case 5, Case 6, and Case 7, if a resource pool is configured with multiple resource selection schemes and/or resource sensing schemes, a pre-emption check procedure defined in Release 16 V2X may be a problem, because the pre-emption check procedure may not work due to a power sensitive UE not performing the pre-emption check procedure.

In an example, UE-1 performs a sidelink transmission with full sensing, and a UE-2 performs a sidelink transmission with a random resource selection. Before UE-1 performs the sidelink transmission on a reserved sidelink resource, UE-1 may perform a pre-emption check procedure. If the reserved sidelink resource of UE-1 is fully or partially overlapped with that of UE-2 and if a priority of UE-2's sidelink transmission is higher than a priority of UE-1's sidelink transmission, UE-2 will not trigger a resource re-selection scheme. Because UE-2 without a sidelink reception capability cannot do sensing to avoid a sidelink resource collision, the sidelink resource collision between UE-1 and UE-2 will happen.

In a further example, reserved resources of two UEs is fully or partially overlapped, and these two UEs may respectively perform sidelink transmissions on their reserved resource(s) due to one UE is a power sensitive UE and does not perform a pre-emption check procedure as expected by the other UE. Then, a sidelink resource collision between two UEs may happen. A specific example is described in FIG. 2.

Figure 2:
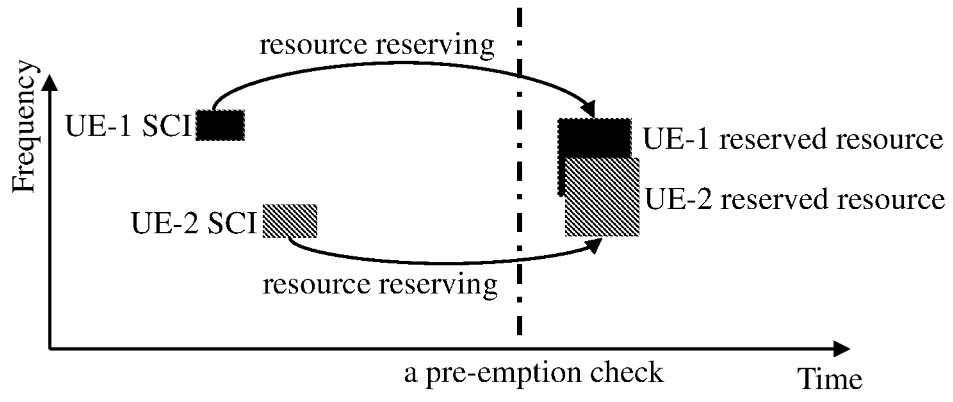
FIG. 2 illustrates an exemplary diagram of a resource collision between two UEs according to some embodiments of the present application.

FIG. 2 illustrates an exemplary diagram of a resource collision between two UEs according to some embodiments of the present application.

In the embodiments of FIG. 2, UE-1 is a full sensing UE which will perform a pre-emption check procedure, and UE-2 is a power sensitive UE which will not perform a pre-emption check procedure. "UE-1 SCI" is used for reserving "UE-1 reserved resource" as shown in FIG. 2, and "UE-2 SCI" is used for reserving "UE-2 reserved resource" as shown in FIG. 2. As shown in FIG. 2, in some embodiments, reserved resource(s) of UE-1 (i.e., UE-1 reserved resource) is partially overlapped with reserved resource(s) of UE-2 (i.e., UE-2 reserved resource). In some other embodiments, UE-1 reserved resource may be fully overlapped with UE-2 reserved resource. That is, in the embodiments of FIG. 2, the abovementioned Condition 1 of a pre-emption check procedure is fulfilled.

In the embodiments of FIG. 2, if SL-RSRP measurement result(s) associated with a resource reserved by UE-2 is higher than an associated SL-RSRP threshold and if a priority of UE-1's sidelink transmission on UE-1 reserved resource is higher than a priority of UE-2's sidelink transmission on UE-2 reserved resource and also higher than a threshold (if any), the abovementioned Conditions 2 and 3 of the pre-emption check procedure are also fulfilled.

When the abovementioned Condition 1 and Condition 2 of the pre-emption check procedure are fulfilled, UE-1 will not trigger a resource re-selection scheme because Condition 3 is not fulfilled, and UE-1 expects that UE-2 can perform a pre-emption check procedure and avoid the resource collision. However, UE-2 will not perform the pre-emption check procedure, since UE-2 is a power sensitive UE without the pre-emption check procedure. Then, UE-1 and UE-2 will respectively perform sidelink transmissions on their own reserved resource(s). Thus, a sidelink resource collision between UE-1 and UE-2 may happen.

Currently, details regarding how to solve a sidelink resource collision between two sidelink UEs have not been discussed in 3GPP 5G technology yet. Embodiments of the present application aim to address a co-existence of a random resource selection scheme and other resource selection scheme(s). Embodiments of the present application define specific alternatives to solve the above issue for different cases. With the above alternatives, a UE with a pre-emption check may perform different pre-emption check behaviors for different UEs. If the UE obtains information that a resource will not be pre-emption checked by another UE, the UE may only check the abovementioned Conditions 1 and 2 of a pre-emption check procedure. Otherwise, the UE may check all the abovementioned Conditions 1-3 of the pre-emption check procedure. More details will be illustrated in the following text in combination with the appended drawings.

Figure 3:
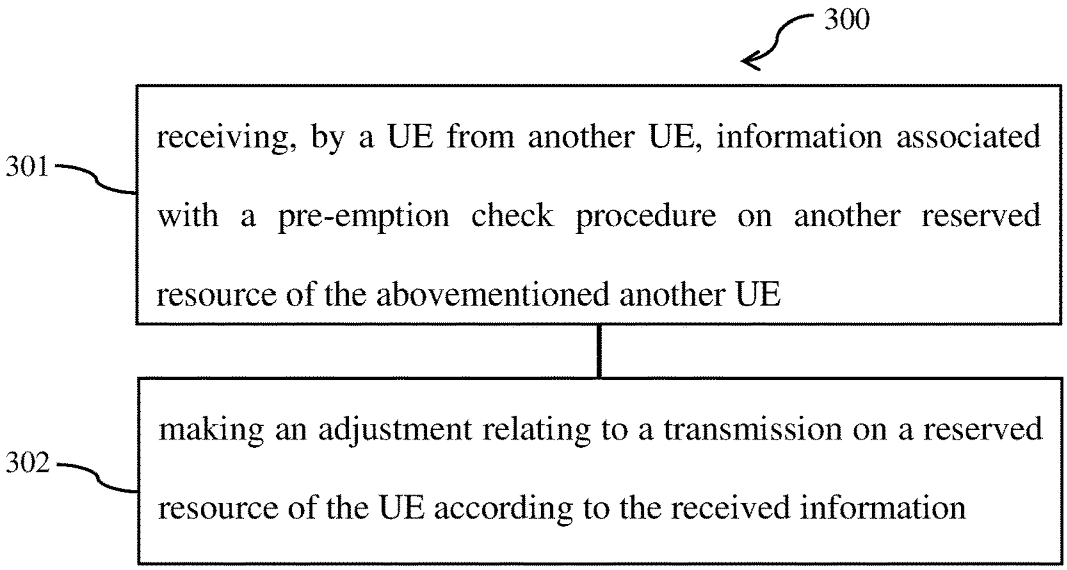
FIG. 3 illustrates an exemplary flow chart of a method for receiving information associated with a pre-emption check procedure on a reserved resource according to some embodiments of the present application.

FIG. 3 illustrates an exemplary flow chart of a method for receiving information associated with a pre-emption check procedure on a reserved resource according to some embodiments of the present application.

Figure 4:
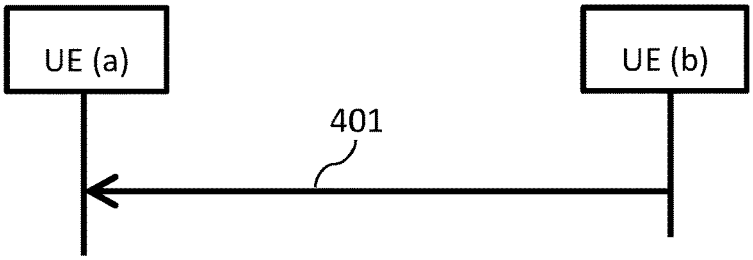
FIG. 4 illustrates an exemplary flow chart of transmitting information associated with a pre-emption check procedure on a reserved resource according to some embodiments of the present application.

The embodiments of FIG. 3 may be performed by a UE (e.g., UE 101 illustrated and shown in FIG. 1, UE-1 illustrated and shown in FIG. 2, or UE (a) illustrated and shown in FIG. 4). Although described with respect to a UE, it should be understood that other devices may be configured to perform a method similar to that of FIG. 3.

In the exemplary method 300 as shown in FIG. 3, in operation 301, a UE (e.g., UE 101 illustrated and shown in FIG. 1) receives, from another UE (e.g., any of UE 102 to UE 105 illustrated and shown in FIG. 1, UE-2 illustrated and shown in FIG. 2, or UE (b) illustrated and shown in FIG. 4), information associated with a pre-emption check procedure on another reserved resource(s) of the abovementioned another UE. In the embodiments of FIG. 3, the UE may function as a Tx UE and the abovementioned another UE may function as a Rx UE.

According to some embodiments, the received information may be received via sidelink control information (SCI). For example, the received information is carried in $1^{st}$ stage sidelink control information (SCI) and/or $2^{nd}$ stage SCI.

According to some further embodiments, the received information includes at least one of following fields:

Field (1): A UE type of the abovementioned another UE. The abovementioned another UE may be a power sensitive UE or a non-power sensitive UE. This UE type may be a power sensitive UE type or a non-power sensitive UE type.

Field (2): An indication regarding whether the abovementioned another UE will perform a pre-emption check procedure on the abovementioned another reserved resource. This indication may indicate that the abovementioned another UE will or will not perform a pre-emption check procedure on the abovementioned another reserved resource.

Field (3): An indication regarding whether the abovementioned another UE has a sidelink reception capability. This indication may indicate that the abovementioned another UE has or does not have a sidelink reception capability.

Field (4): An indication regarding whether the abovementioned another UE has a SCI reception capability. This indication may indicate that the abovementioned another UE has or does not have a SCI reception capability.

Field (5): An indication regarding whether the abovementioned another UE has a sensing capability. This indication may indicate that the abovementioned another UE has or does not have a sensing capability.

According to some embodiments, at least one of Fields (1)-(5) within the information which is received in operation 301 may be explicitly carried in a field in SCI. For instance, the field in SCI includes 1 bit, or some reserved bit(s) defined in SCI format 1-A, SCI format 2-A, or SCI format 2-B may be used for the field.

In an embodiment, a UE implicitly informs other UEs whether it will perform a pre-emption check procedure for the UE's reserved resource(s) by at least one of following manners: 1 bit in SCI to indicate a UE type of the UE; 1 bit in SCI to indicate the UE's sidelink reception capability; 1 bit in SCI to indicate the UE's SCI reception capability; and 1 bit in SCI to indicate the UE's sensing capability. Based on the bit in SCI of these manners, other UEs may determine whether the UE will perform a pre-emption check procedure for the UE's reserved resource(s). More details are illustrated in Embodiments 1 and 2 in following text.

In a further embodiment, a UE explicitly transmits 1 bit in SCI, e.g., in 1$^{st}$ stage SCI or 2$^{nd}$ stage SCI, to indicate to other UEs whether the UE will perform a pre-emption check procedure for the UE's reserved resource(s). For example, value "1" of the bit in SCI means that the UE will perform the pre-emption check procedure, and value "0" of the bit in SCI means that the UE will not perform the pre-emption check procedure. More details are illustrated in Embodiment 3 in following text.

According to some other embodiments, at least one of Fields (2)-(5) within the information received in operation 301 may be implicitly carried by at least one of:

a format of 2$^{nd}$ stage SCI;

a radio network temporary identifier (RNTI) of 1$^{st}$ stage SCI and/or 2$^{nd}$ stage SCI; and a destination identifier (ID) of a traffic of the abovementioned UE.

Referring back to FIG. 3, in operation 302, according to the received information, the UE makes an adjustment relating to a transmission on a reserved resource(s) of the UE. According to some embodiments, the abovementioned another reserved resource(s) of the abovementioned another UE is fully or partially overlapped with the reserved resource(s) of the UE.

According to some embodiments, if the UE detects that both the abovementioned Condition 1 and the abovementioned Condition 2 are fulfilled (i.e., the abovementioned another reserved resource is fully or partially overlapped with the reserved resource; and a SL-RSRP measurement result associated with the abovementioned another reserved resource is higher than an associated SL-RSRP threshold), the UE may perform different behaviors in following Case A to Case G.

In particular, in each of Case A to Case E, the UE making the adjustment in operation 302 further comprises: triggering a resource re-selection scheme for the transmission on the reserved resource of the UE; and/or increasing a power of the transmission on the reserved resource of the UE. The UE increasing a power of the transmission may be implemented by performing power boosting for this transmission. For example, if a UE detects that remaining packet delay budget (PDB) of this UE is not sufficient for its resource re-selection scheme or the UE detects that remaining candidate resources are not sufficient for its resource re-selection scheme, the UE may perform power boosting for this transmission.

Case A: the abovementioned another UE is a power sensitive UE.

Case B: the abovementioned another UE will perform a pre-emption check procedure on the abovementioned another resource.

Case C: the abovementioned another UE does not have a sidelink reception capability.

Case D: the abovementioned another UE does not have a SCI reception capability.

Case E: the abovementioned another UE does not have a sensing capability.

In following Case F or Case G, the UE making the adjustment in operation 302 further comprises: triggering a resource re-selection scheme for the transmission on the reserved resource of the UE.

Case F: a priority threshold is configured to the UE and the abovementioned another UE, the abovementioned Condition 3 is fulfilled (i.e., a traffic priority associated with a transmission on the abovementioned another reserved resource of the abovementioned another UE is higher than both the configured priority threshold and a traffic priority associated with the transmission on the reserved resource of the UE), and in one of following scenarios:

(1) the abovementioned another UE is a non-power sensitive UE;

(2) the abovementioned another UE will not perform a pre-emption check procedure on the abovementioned another resource;

(3) the abovementioned another UE has a sidelink reception capability;

(4) the abovementioned another UE has a SCI reception capability; or (5) the abovementioned another UE has a sensing capability.

Case G: no priority threshold is configured to the UE and the abovementioned another UE, the abovementioned Condition 3 is fulfilled (i.e., a traffic priority associated with a transmission on the abovementioned another reserved resource of the abovementioned another UE is higher than a traffic priority associated with the transmission on the reserved resource of the UE), and in one of following scenarios:

(1) the abovementioned another UE is a non-power sensitive UE;

(2) the abovementioned another UE will not perform a pre-emption check procedure on the abovementioned another resource;
(3) the abovementioned another UE has a sidelink reception capability;
(4) the abovementioned another UE has a SCI reception capability; or
(5) the abovementioned another UE has a sensing capability.

Details described in the embodiments as illustrated and shown in FIGS. 1, 2, 4, and 5, especially, contents related to information associated with a pre-emption check procedure on a reserved resource, are applicable for the embodiments as illustrated and shown in FIG. 3. Moreover, details described in the embodiments of FIG. 3 are applicable for all the embodiments of FIGS. 1, 2, 4, and 5.

FIG. 4 illustrates an exemplary flow chart of transmitting information associated with a pre-emption check procedure on a reserved resource according to some embodiments of the present application.

In the embodiments of FIG. 4, UE (a) may be UE 101 illustrated and shown in FIG. 1, UE-1 illustrated and shown in FIG. 2, or the UE illustrated and shown in FIG. 3. UE (b) may be any of UE 102 to UE 105 illustrated and shown in FIG. 1, UE-2 illustrated and shown in FIG. 2, or the abovementioned another UE illustrated and shown in FIG. 3.

As shown in FIG. 4, in operation 401, UE (b) transmits, to UE (a), information associated with a pre-emption check procedure on a reserved resource(s) of UE (b). Through the transmitted information, UE (b) may inform UE (a) whether UE (b) will perform a pre-emption check procedure for a reserved resource(s) of UE (b). Then, according to the information transmitted in operation 401, UE (a) may make an adjustment relating to a transmission on a reserved resource(s) of UE (a). For instance, UE (a) may trigger a resource re-selection scheme for the transmission on the reserved resource(s) of UE (a) and/or increase a power of the transmission on the reserved resource of UE (a) in different cases.

In an embodiment, the information transmitted in operation 401 includes an explicit UE type indication or an implicit UE type indication. In a further embodiment, the information transmitted in operation 401 includes an explicit sidelink reception capability indication or an implicit sidelink reception capability indication. In another embodiment, the information transmitted in operation 401 includes an explicit SCI reception capability indication or an implicit SCI reception capability indication. In an additional embodiment, the information transmitted in operation 401 includes an explicit sensing capability indication or an implicit sensing capability indication.

Details described in the embodiments as illustrated and shown in FIGS. 1-3 and 5, especially, contents related to information associated with a pre-emption check procedure on a reserved resource, are applicable for the embodiments as illustrated and shown in FIG. 4. Moreover, details described in the embodiments of FIG. 4 are applicable for all the embodiments of FIGS. 1-3 and 5.

The following texts describe specific Embodiments 1-3 of the methods as shown and illustrated in FIGS. 3 and 4.

Embodiment 1

Embodiment 1 handles a case in which a UE (e.g., any of UE 102 to UE 105 illustrated and shown in FIG. 1) informs other UE(s) (e.g., UE 101 illustrated and shown in FIG. 1) whether the UE will perform a pre-emption check procedure for reserved resource(s).

Embodiment 1 assumes that a pre-emption check procedure is not supported by a power sensitive UE (e.g., Type A UE, Type B UE, or Type D UE). In Embodiment 1, a power sensitive UE may perform a random resource selection scheme or a resource selection scheme based on partial sensing, and the power sensitive UE will not perform a pre-emption check procedure before a sidelink transmission.

In particular, according to Embodiment 1, a UE may explicitly or implicitly transmit a UE type indication to other UE(s).

In an explicit manner of Embodiment 1, the UE may transmit 1 bit in SCI (e.g., in $1^{st}$ stage or $2^{nd}$ stage SCI) to indicate its UE type. For instance, value "1" of the bit in SCI means that the UE is a power sensitive UE, and value "0" of the bit in SCI means that the UE is a non-power sensitive UE, or vice versa.

In an implicit manner of Embodiment 1, the UE may adopt any of following three options.

(1) Option 1: A UE transmits both $1^{st}$ stage SCI and $2^{nd}$ stage SCI for a sidelink transmission. The $1^{st}$ stage SCI may be common for both a power sensitive UE and a non-power sensitive UE. The $2^{nd}$ stage SCI may be different for a power sensitive UE and a non-power sensitive UE. For instance, different formats of $2^{nd}$ stage SCI are used for a power sensitive UE and a non-power sensitive UE. Then, a non-power sensitive UE can distinguish the sidelink transmission of the power sensitive UE via the format of $2^{nd}$ stage SCI implicitly.
(2) Option 2: Different RNTI values are used for a power sensitive UE and a non-power sensitive UE. Two RNTI values can be respectively configured, pre-configured, or specified for a power sensitive UE and a non-power sensitive UE. A RNTI value is used to scramble a cyclic redundancy check (CRC) for $1^{st}$ stage SCI and/or $2^{nd}$ stage SCI. According to the RNTI value, a UE can distinguish different resource reservations from a power sensitive UE and a non-power sensitive UE.
(3) Option 3: A pedestrian to a vehicle (P2V) traffic or a pedestrian to a pedestrian (P2P) traffic may be transmitted by a power sensitive UE. If a dedicated destination ID is specified or configured for a P2V or P2P traffic, the UE can distinguish reserved resource(s) from a power sensitive UE or a non-power sensitive UE, and thus different pre-emption check behaviors may be performed.

In Embodiment 1, a pre-emption check behavior may be configured as that only non-power sensitive UEs perform a pre-emption check procedure. In particular, regarding a UE's pre-emption check behavior:

(1) If a non-power sensitive UE detects a resource reserved by a power sensitive UE and if both the abovementioned Condition 1 and Condition 2 are fulfilled, the non-power sensitive UE may:
  a) trigger a resource re-selection scheme; and/or
  b) perform power boosting for a transmission of the non-power sensitive UE. For example, when the non-power sensitive UE detects that the remaining PDB of this UE is not sufficient for its resource re-selection scheme or detects that remaining candidate resources are not sufficient for its resource re-selection scheme, the non-power sensitive UE performs the power boosting for its transmission.

(2) If a non-power sensitive UE detects one resource reserved by another non-power sensitive UE, when all the abovementioned Condition 1 and Condition 2 and Condition 3 are fulfilled, the non-power sensitive UE may trigger a resource re-selection for a transmission of the non-power sensitive UE.

Embodiment 2

Embodiment 2 handles a case in which a UE (e.g., any of UE 102 to UE 105 illustrated and shown in FIG. 1) informs other UE(s) (e.g., UE 101 illustrated and shown in FIG. 1) whether the UE will perform pre-emption check for one reserved resource.

Embodiment 2 assumes that a pre-emption check procedure is supported by Type D power sensitive UE, but not supported by Type A power sensitive UE or Type B power sensitive UE. In Embodiment 2, a power sensitive UE may perform a random resource selection scheme, a resource selection scheme based on partial sensing, or a resource selection scheme based on full sensing. Embodiment 2 may include following two alternatives.

Alternative 1 of Embodiment 2

Alternative 1 of Embodiment 2 assumes that a pre-emption check procedure is mandatory for Type D power sensitive UE, and Type D power sensitive UE should perform a pre-emption check before a transmission on each reserved transmission occasion. In particular, the UE may explicitly or implicitly transmit a sidelink reception capability indication, a SCI reception capability indication, and/or a sensing capability indication.

In an explicit manner of Alternative 1, a UE may transmit 1 bit in SCI (e.g., in $1^{st}$ stage SCI or $2^{nd}$ stage SCI) to indicate its sidelink reception capability, its SCI reception capability, or its sensing capability. In an example, value “1” of the bit means that the UE has no sidelink reception capability, and value “0” of the bit means that the UE has a sidelink reception capability, and vice versa. In a further example, value “1” of the bit means that the UE has no SCI reception capability, and value “0” of the bit means that the UE has a SCI reception capability, and vice versa. In another example, value “1” of the bit means that the UE has no sensing capability, and value “0” of the bit means that the UE has a sensing capability, and vice versa.

In an implicit manner of Alternative 1, different RNTI values are configured for “a UE with a sidelink reception capability, a SCI reception capability, or a sensing capability” and “a UE without a sidelink reception capability, a SCI reception capability, or a sensing capability”. For example, two RNTI values can be respectively configured, pre-configured, or specified for UEs with and without a sidelink reception capability, a SCI reception capability, or a sensing capability. A RNTI value is used to scramble the CRC for $1^{st}$ stage SCI and/or $2^{nd}$ stage SCI. According to the RNTI value, a UE can distinguish different resource reservations from UEs with and without a sidelink reception capability, a SCI reception capability, or a sensing capability.

In Alternative 1 of Embodiment 2, regarding a pre-emption check behavior, UE(s) with a sidelink reception capability, a SCI reception capability, or a sensing capability (e.g., Type D UE and a non-power sensitive UE) will perform a pre-emption check procedure.

In particular, with reference to some embodiments of FIG. 1, for example, if UE 101 is with a sidelink reception capability, a SCI reception capability, or a sensing capability and UE 101 detects a resource reserved by UE 102 which is without a sidelink reception capability, a SCI reception capability, or a sensing capability and if the abovementioned Condition 1 and Condition 2 are fulfilled (i.e., a reserved resource of UE 101 is fully or partially overlapped with a reserved resource of UE 102; and a SL-RSRP measurement result associated with the reserved resource of UE 102 is higher than an associated SL-RSRP threshold), UE 101 may:

trigger a resource re-selection scheme; and/or

Perform power boosting for a transmission on the reserved resource of UE 101. For example, UE 101 detects that remaining PDB of UE 101 is not sufficient for its resource re-selection or remaining candidate resources are not sufficient for its resource re-selection scheme, UE 101 may perform power boosting for the transmission on the reserved resource of UE 101.

With reference to some other embodiments of FIG. 1, for example, if UE 101 detects one resource reserved by UE 103 which is with a sidelink reception capability, a SCI reception capability, or a sensing capability, when all the abovementioned Condition 1 and Condition 2 and Condition 3 are fulfilled (i.e., a reserved resource of UE 101 is fully or partially overlapped with a reserved resource of UE 103; a SL-RSRP measurement result associated with the reserved resource of UE 103 is higher than an associated SL-RSRP threshold; and a priority of UE 101's transmission on the reserved resource of UE 101 is higher than a priority of UE 103's transmission on a reserved resource of UE 103 and also higher than a threshold (if any)), UE 101 may trigger a resource re-selection scheme for the transmission on the reserved resource of UE 101.

Alternative 2 of Embodiment 2

Alternative 2 of Embodiment 2 assumes that a pre-emption check procedure is not mandatory for Type D power sensitive UE, and Type D power sensitive UE may determine if it will perform a pre-emption check procedure by its implementation. For example, Type D power sensitive UE may determine if it will perform a pre-emption check procedure based on the remaining power, block error radio (BLER) of a previous sidelink transmission, and/or a hybrid automatic repeat request (HARD) feedback of the previous sidelink transmission. In Alternative 2 of Embodiment 2, a manner of using 1 bit in SCI to indicate a UE's sidelink reception capability doesn't work.

Embodiment 3

In Embodiment 3, a UE may directly transmit an explicit indicator to indicate whether the UE will perform a pre-emption check procedure for reserved resource(s). For instance, the indicator is carried by 1 bit in SCI, e.g., in $1^{st}$ stage SCI or $2^{nd}$ stage SCI. Value “1” of the bit means that the UE will perform a pre-emption check procedure for the reserved resource(s), and value “0” of the bit means that the UE will not perform a pre-emption check for the reserved resources.

For example, Type A power sensitive UE or Type B power sensitive UE may always transmit value “0” due to a loss of a sidelink reception capability. Type D power sensitive UE may always transmit value “1” if a pre-emption check procedure is mandatory for Type D power sensitive UE. Otherwise, Type D power sensitive UE may transmit value “0” or value “1” based on its implementation. A non-power sensitive UE may always transmit value “1”.

In Embodiment 3, regarding a pre-emption check behavior, for a UE which would perform a pre-emption check procedure (e.g., a non-power sensitive UE or Type D power sensitive UE):

(1) If the UE detects SCI and a value of the indicator in the SCI is "0" (which means that another UE will not perform a pre-emption check for the reserved resources), the UE may:
  - trigger a resource re-selection scheme when the abovementioned Condition 1 and Condition 2 are fulfilled; and/or
  - perform power boosting for a transmission of the UE (e.g., when the UE detects the remaining PDB of this UE is not sufficient for its resource re-selection scheme or remaining candidate resources are not sufficient for its resource re-selection scheme).

(2) If the UE detects SCI and a value of the indicator in the SCI is "1" (which means that another UE will perform a pre-emption check for the reserved resources), the UE may trigger a resource re-selection scheme when the abovementioned Condition 1 and Condition 2 and Condition 3 are fulfilled.

Figure 5:
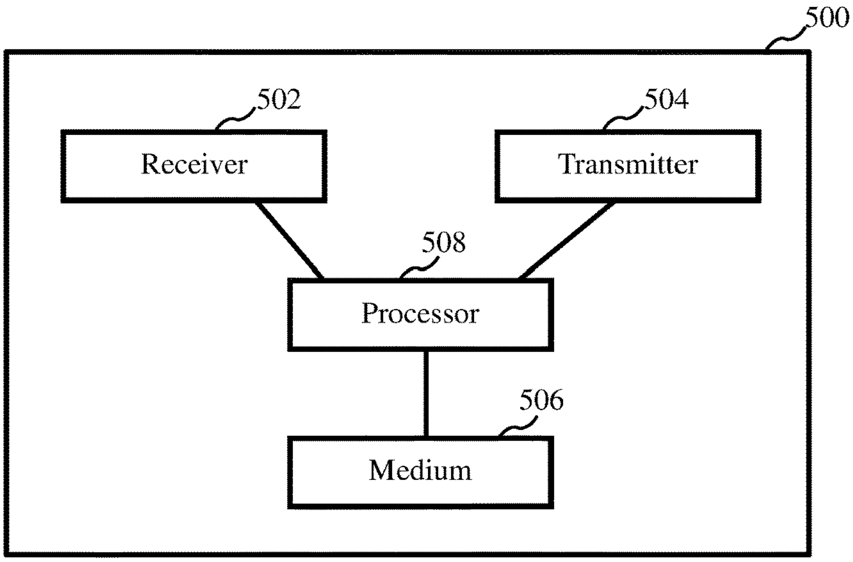
FIG. 5 illustrates an exemplary block diagram of an apparatus according to some embodiments of the present application.

FIG. 5 illustrates an exemplary block diagram of an apparatus according to some embodiments of the present application. In some embodiments of the present application, the apparatus 500 may be a UE, which can at least perform the method illustrated in any one of FIGS. 2-4.

As shown in FIG. 5, the apparatus 500 may include at least one receiver 502, at least one transmitter 504, at least one non-transitory computer-readable medium 506, and at least one processor 508 coupled to the at least one receiver 502, the at least one transmitter 504, and the at least one non-transitory computer-readable medium 506.

Although in FIG. 5, elements such as the at least one receiver 502, the at least one transmitter 504, the at least one non-transitory computer-readable medium 506, and the at least one processor 508 are described in the singular, the plural is contemplated unless limitation to the singular is explicitly stated. In some embodiments of the present application, the at least one receiver 502 and the at least one transmitter 504 are combined into a single device, such as a transceiver. In certain embodiments of the present application, the apparatus 500 may further include an input device, a memory, and/or other components.

In some embodiments of the present application, the at least one non-transitory computer-readable medium 506 may have stored thereon computer-executable instructions which are programmed to implement the operations of the methods, for example as described in view of any of FIGS. 2-4, with the at least one receiver 502, the at least one transmitter 504, and the at least one processor 508.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a first user equipment (UE), the method comprising:
  - receiving, from a second UE, information associated with a pre-emption check procedure on a second reserved resource of the second UE, wherein the information includes an indication that the second UE will perform the pre-emption check procedure on the second reserved resource or that the second UE will not perform the pre-emption check procedure on the second reserved resource; and
  - making an adjustment relating to a first transmission on a first reserved resource of the first UE according to the information in response to detecting that the second reserved resource is fully or partially overlapped with the first reserved resource, wherein the adjustment is based on the second UE performing the pre-emption check procedure on the second reserved resource.

2. The method of claim 1, wherein the information is received via at least one of:
  - a first stage sidelink control information (SCI); and
  - a second stage SCI.

3. The method of claim 1, wherein the information includes at least one of:
  - a UE type of the second UE;
  - a second indication regarding whether the second UE has a sidelink reception capability;
  - a third indication regarding whether the second UE has a sidelink control information (SCI) reception capability; and
  - a fourth indication regarding whether the second UE has a sensing capability.

4. The method of claim 1, wherein, in response to detecting that the second reserved resource is fully or partially overlapped with the first reserved resource and in response to a sidelink reference signal received power (SL-RSRP) measurement result associated with the second reserved resource being higher than an associated SL-RSRP threshold:
  - in response to the second UE being a power sensitive UE, making the adjustment relating to the first transmission further comprises at least one of:

triggering a resource re-selection scheme for the first transmission; and increasing a power of the first transmission; and in response to the second UE being a non-power sensitive UE:

in response to a priority threshold being configured to the first UE and the second UE and in response to a traffic priority associated with a second transmission on the second reserved resource being higher than both the priority threshold and a traffic priority associated with the first transmission, making the adjustment relating to the first transmission further comprises triggering the resource re-selection scheme for the first transmission; or in response to the priority threshold not being configured to the first UE and the second UE and in response to the traffic priority associated with the second transmission being higher than the traffic priority associated with the first transmission, making the adjustment relating to the first transmission further comprises triggering the resource re-selection scheme for the first transmission.

5. A first user equipment (UE) for wireless communication, comprising:

at least one memory; and at least one processor coupled with the at least one memory and configured to cause the first UE to:

receive, from a second UE, information associated with a pre-emption check procedure on a second reserved resource of the second UE, wherein the information includes an indication that the second UE will perform the pre-emption check procedure on the second reserved resource or that the second UE will not perform the pre-emption check procedure on the second reserved resource; and make an adjustment relating to a first transmission on a first reserved resource of the first UE according to the information in response to detecting that the second reserved resource is fully or partially overlapped with the first reserved resource, wherein the adjustment is based on the second UE performing the pre-emption check procedure on the second reserved resource.

6. The first UE of claim 5, wherein the information is received via at least one of:

a first stage sidelink control information (SCI); and a second stage SCI.

7. The first UE of claim 5, wherein the information includes at least one of:

a UE type of the second UE;

a second indication regarding whether the second UE has a sidelink reception capability;

a third indication regarding whether the second UE has a sidelink control information (SCI) reception capability; and a fourth indication regarding whether the second UE has a sensing capability.

8. The first UE of claim 7, wherein the UE type of the second UE is one of:

a power sensitive UE type; and a non-power sensitive UE type.

9. The first UE of claim 7, wherein the second indication indicates one of:

the second UE has the sidelink reception capability; and the second UE does not have the sidelink reception capability.

10. The first UE of claim 7, wherein the third indication indicates one of:

the second UE has the SCI reception capability; and the second UE does not have the SCI reception capability.

11. The first UE of claim 7, wherein the fourth indication indicates one of:

the second UE has the sensing capability; and the second UE does not have the sensing capability.

12. The first UE of claim 7, wherein at least one of the indication, the second indication, the third indication, and the fourth indication is implicitly carried by at least one of:

a format of a second stage SCI;

a radio network temporary identifier (RNTI) of at least one of a first stage SCI and the second stage SCI; and a destination identifier (ID) of a traffic of the second UE.

13. The first UE of claim 5, wherein, in response to detecting that the second reserved resource is fully or partially overlapped with the first reserved resource and in response to a sidelink reference signal received power (SL-RSRP) measurement result associated with the second reserved resource being higher than an associated SL-RSRP threshold:

in response to the second UE being a power sensitive UE, to make the adjustment relating to the first transmission is to at least one of:

trigger a resource re-selection scheme for the first transmission; and increase a power of the first transmission; and in response to the second UE being a non-power sensitive UE:

in response to a priority threshold being configured to the first UE and the second UE and in response to a traffic priority associated with a second transmission on the second reserved resource being higher than both the priority threshold and a traffic priority associated with the first transmission, to make the adjustment relating to the first transmission is to trigger the resource re-selection scheme for the first transmission; or in response to the priority threshold not being configured to the first UE and the second UE and in response to the traffic priority associated with the second transmission being higher than the traffic priority associated with the first transmission, to make the adjustment relating to the first transmission is to trigger the resource re-selection scheme for the first transmission.

14. The first UE of claim 5, wherein, in response to detecting that the second reserved resource is fully or partially overlapped with the first reserved resource and in response to a sidelink reference signal received power (SL-RSRP) measurement result associated with the second reserved resource being higher than an associated SL-RSRP threshold:

in response to that the second UE will perform the pre-emption check procedure on the second reserved resource, to make the adjustment relating to the first transmission is to at least one of:

trigger a resource re-selection scheme for the first transmission; and increase a power of the first transmission; and in response to that the second UE will not perform the pre-emption check procedure on the second reserved resource:

in response to a priority threshold being configured to the first UE and the second UE and in response to a traffic priority associated with a second transmission on the second reserved resource being higher than both the priority threshold and a traffic priority associated with the first transmission, to make the adjustment relating to the first transmission is to trigger the resource re-selection scheme for the first transmission; or in response to the priority threshold not being configured to the first UE and the second UE and in response to the traffic priority associated with the second transmission being higher than the traffic priority associated with the first transmission, to make the adjustment relating to the first transmission is to trigger the resource re-selection scheme for the first transmission.

15. The first UE of claim 5, wherein, in response to detecting that the second reserved resource is fully or partially overlapped with the first reserved resource and in response to a sidelink reference signal received power (SL-RSRP) measurement result associated with the second reserved resource being higher than an associated SL-RSRP threshold:

in response to the second UE not having a sidelink reception capability, to make the adjustment relating to the first transmission is to at least one of:

trigger a resource re-selection scheme for the first transmission; and increase a power of the first transmission; and in response to the second UE having the sidelink reception capability:

in response to a priority threshold being configured to the first UE and the second UE and in response to a traffic priority associated with a second transmission on the second reserved resource being higher than both the priority threshold and a traffic priority associated with the first transmission, to make the adjustment relating to the first transmission is to trigger the resource re-selection scheme for the first transmission; or in response to the priority threshold not being configured to the first UE and the second UE and in response to the traffic priority associated with the second transmission being higher than the traffic priority associated with the first transmission, to make the adjustment relating to the first transmission is to trigger the resource re-selection scheme for the first transmission.

16. The first UE of claim 5, wherein, in response to detecting that the second reserved resource is fully or partially overlapped with the first reserved resource and in response to a sidelink reference signal received power (SL-RSRP) measurement result associated with the second reserved resource being higher than an associated SL-RSRP threshold:

in response to the second UE not having a SCI reception capability, to make the adjustment relating to the first transmission is to at least one of:

trigger a resource re-selection scheme for the first transmission; and increase a power of the first transmission; and in response to the second UE having the SCI reception capability:

in response to a priority threshold being configured to the first UE and the second UE and in response to a traffic priority associated with a second transmission on the second reserved resource being higher than both the priority threshold and a traffic priority associated with the first transmission, to make the adjustment relating to the first transmission is to trigger the resource re-selection scheme for the first transmission; or in response to the priority threshold not being configured to the first UE and the second UE and in response to the traffic priority associated with the second transmission being higher than the traffic priority associated with the first transmission, to make the adjustment relating to the first transmission is to trigger the resource re-selection scheme for the first transmission.

17. The first UE of claim 5, wherein, in response to detecting that the second reserved resource is fully or partially overlapped with the first reserved resource and in response to a sidelink reference signal received power (SL-RSRP) measurement result associated with the second reserved resource being higher than an associated SL-RSRP threshold:

in response to the second UE not having a sensing capability, to make the adjustment relating to the first transmission is to at least one of:

trigger a resource re-selection scheme for the first transmission; and increase a power of the first transmission; and in response to the second UE having the sensing capability:

in response to a priority threshold being configured to the first UE and the second UE and in response to a traffic priority associated with a second transmission on the second reserved resource being higher than both the priority threshold and a traffic priority associated with the first transmission, to make the adjustment relating to the first transmission is to trigger the resource re-selection scheme for the first transmission; or in response to the priority threshold not being configured to the first UE and the second UE and in response to the traffic priority associated with the second transmission being higher than the traffic priority associated with the first transmission, to make the adjustment relating to the first transmission is to trigger the resource re-selection scheme for the first transmission.

18. A method performed by a first user equipment (UE), the method comprising:

transmitting, to a second UE, information associated with a pre-emption check procedure on a first reserved resource of the first UE, wherein the information includes an indication that the first UE will perform the pre-emption check procedure on the first reserved resource or that the first UE will not perform the pre-emption check procedure on the first reserved resource, and wherein an adjustment relating to a transmission on a second reserved resource of the second UE is made according to the information in response to the first reserved resource being fully or partially overlapped with the second reserved resource, the adjustment based on the first UE performing the pre-emption check procedure on the first reserved resource.

19. A first user equipment (UE) for wireless communication, comprising:

at least one memory; and at least one processor coupled with the at least one memory and configured to cause the UE to:

transmit, to a second UE, information associated with a pre-emption check procedure on a first reserved resource of the first UE, wherein the information includes an indication that the first UE will perform the pre-emption check procedure on the first reserved resource or that the first UE will not perform the pre-emption check procedure on the first reserved resource, and wherein an adjustment relating to a transmission on a second reserved resource of the second UE is made according to the information in response to the first reserved resource being fully or partially overlapped with the second reserved resource, the adjustment based on the first UE performing the pre-emption check procedure on the first reserved resource.

20. The first UE of claim 19, wherein the information is transmitted via at least one of:

a first stage sidelink control information (SCI); and a second stage SCI.

* * * * *